US012790534B2

(12) United States Patent
Radwan

(10) Patent No.: US 12,790,534 B2
(45) Date of Patent: Nov. 10, 2026

(54) GAS GENERATING COMPOSITIONS AND USES

(71) Applicant: Tenex Technologies, LLC, Berwyn, PA (US)

(72) Inventor: Amr Radwan, Berwyn, PA (US)

(73) Assignee: Tenex Technologies, LLC, Berwyn, PA (US)

( * ) Notice: Subject to any disclaimer, the term of this patent is extended or adjusted under 35 U.S.C. 154(b) by 0 days.

(21) Appl. No.: 18/491,980

(22) Filed: Oct. 23, 2023

(65) Prior Publication Data

US 2024/0124764 A1 Apr. 18, 2024

Related U.S. Application Data

(63) Continuation of application No. 16/991,734, filed on Aug. 12, 2020, now Pat. No. 11,827,849.

(60) Provisional application No. 62/885,845, filed on Aug. 13, 2019.

(51) Int. Cl.
*C09K 8/70* (2006.01)
*C09K 8/66* (2006.01)
*C09K 8/80* (2006.01)
*E21B 43/26* (2006.01)

(52) U.S. Cl.
CPC ................ *C09K 8/70* (2013.01); *C09K 8/665* (2013.01); *C09K 8/80* (2013.01); *E21B 43/2605* (2020.05)

(58) Field of Classification Search
None
See application file for complete search history.

(56) References Cited

U.S. PATENT DOCUMENTS 2,975,834 A * 3/1961 West ........................ E21B 43/27 166/308.1
4,590,997 A * 5/1986 Stowe ................... E21B 43/263 166/250.1
6,528,157 B1 3/2003 Hussain et al.
7,131,491 B2 11/2006 Blauch et al.
7,350,579 B2 4/2008 Gatlin et al.
7,363,976 B1 4/2008 Burts, Jr. et al.
7,363,978 B2 4/2008 Welton et al.
8,163,679 B2 4/2012 Getzlaf et al.
8,183,186 B2 5/2012 Luo et al.
8,720,556 B2 5/2014 Todd
8,993,489 B2 3/2015 McDaniel et al.
9,018,147 B2 4/2015 Luo et al.
(Continued)

FOREIGN PATENT DOCUMENTS

EP 2864442 10/2018
WO WO 2011026192 * 3/2011 .............. C10G 1/00
(Continued)

OTHER PUBLICATIONS

Non-Final Office Action dated May 11, 2023 in related U.S. Appl. No. 17/482,931.
(Continued)

*Primary Examiner* — Anuradha Ahuja
(74) *Attorney, Agent, or Firm* — Armstrong Teasdale LLP

(57) ABSTRACT

Hydrocarbon-bearing formation treatment fluid compositions and systems, in addition to methods of hydraulic fracturing a hydrocarbon-bearing formation and/or mitigating well-to-well communication between an infill well and an adjacent offset well, are described herein.

19 Claims, 1 Drawing Sheet

(56) References Cited

U.S. PATENT DOCUMENTS

| | | | |
|---|---|---|---|
| 9,045,678 B2 | 6/2015 | Rediger | |
| 9,085,975 B2 | 7/2015 | Abad | |
| 9,488,042 B2 | 11/2016 | Al-Nakhli et al. | |
| 9,562,425 B2 | 2/2017 | Nguyen et al. | |
| 9,745,506 B2 | 8/2017 | Reyes et al. | |
| 9,790,774 B2 | 10/2017 | Nguyen et al. | |
| 9,879,515 B2 | 1/2018 | Green et al. | |
| 9,920,610 B2 | 3/2018 | Nelson et al. | |
| 9,944,845 B2 | 4/2018 | Tanguay et al. | |
| 9,951,266 B2 | 4/2018 | Tang | |
| 10,017,688 B1 | 7/2018 | Green et al. | |
| 10,100,247 B2 | 10/2018 | Green et al. | |
| 10,208,242 B2 | 2/2019 | Mccrary et al. | |
| 10,309,208 B2 | 6/2019 | Nguyen et al. | |
| 10,655,444 B2 | 5/2020 | Nguyen et al. | |
| 2003/0072705 A1 | 4/2003 | Kindig et al. | |
| 2008/0108519 A1 | 5/2008 | Harris et al. | |
| 2008/0230223 A1 | 9/2008 | McCrary et al. | |
| 2009/0078417 A1 | 3/2009 | Sullivan et al. | |
| 2009/0139719 A1 | 6/2009 | Luo et al. | |
| 2009/0252671 A1 | 10/2009 | Fullerton | |
| 2010/0032159 A1 | 2/2010 | Saini et al. | |
| 2012/0024530 A1 | 2/2012 | Todd et al. | |
| 2012/0097393 A1* | 4/2012 | Dams | C09K 8/68<br>166/279 |
| 2014/0144639 A1 | 5/2014 | Nguyen et al. | |
| 2015/0315458 A1 | 11/2015 | Tanguay et al. | |
| 2015/0368541 A1 | 12/2015 | Monclin et al. | |
| 2016/0024376 A1 | 1/2016 | Fitzgerald et al. | |
| 2016/0084053 A1 | 3/2016 | Stehle | |
| 2016/0215208 A1 | 7/2016 | Monastiriotis et al. | |
| 2016/0280983 A1 | 9/2016 | Zamora et al. | |
| 2016/0333260 A1 | 11/2016 | Drake et al. | |
| 2016/0376496 A1 | 12/2016 | Gershanovich et al. | |
| 2017/0051599 A1 | 2/2017 | Bestaoui-Spurr et al. | |
| 2017/0130116 A1 | 5/2017 | McDonald et al. | |
| 2017/0198214 A1 | 7/2017 | Lieng et al. | |
| 2017/0355016 A1 | 12/2017 | Roy et al. | |
| 2018/0134948 A1 | 5/2018 | Chopade et al. | |
| 2018/0223180 A1 | 8/2018 | Hall et al. | |
| 2018/0230370 A1 | 8/2018 | Johnson et al. | |
| 2018/0291255 A1 | 10/2018 | Southwell | |
| 2018/0362834 A1 | 12/2018 | Haghighi et al. | |
| 2018/0362838 A1 | 12/2018 | Skiba et al. | |
| 2019/0032463 A1 | 1/2019 | Nguyen | |
| 2019/0040310 A1 | 2/2019 | Montalvo et al. | |
| 2019/0153303 A1 | 5/2019 | Riley et al. | |
| 2020/0048530 A1 | 2/2020 | Nguyen et al. | |
| 2021/0148209 A1* | 5/2021 | Stark | E21B 43/263 |
| 2022/0127519 A1 | 4/2022 | McRobbie et al. | |
| 2022/0127521 A1 | 4/2022 | McRobbie et al. | |

FOREIGN PATENT DOCUMENTS

| | | |
|---|---|---|
| WO | 2014004611 | 1/2014 |
| WO | 2016070044 | 5/2016 |
| WO | 2018183357 | 10/2018 |
| WO | 2020251935 | 12/2020 |

OTHER PUBLICATIONS

Final Office Action dated Oct. 31, 2023 in related U.S. Appl. No. 17/482,931.

Non-Final Office Action dated Nov. 15, 2023 in related U.S. Appl. No. 18/021,496.

Advisory Action dated Jan. 3, 2024 in related U.S. Appl. No. 17/482,931.

Advisory Action dated Aug. 28, 2024 in related U.S. Appl. No. 18/021,496.

Final Office Action dated Apr. 25, 2024 in related U.S. Appl. No. 18/021,496.

Non-Final Office Action dated Jan. 13, 2025 in related U.S. Appl. No. 18/021,496.

Final Office Action dated Apr. 29, 2025 in related U.S. Appl. No. 18/021,496.

Non-Final Office Action dated Sep. 4, 2025 in related U.S. Appl. No. 18/021,496.

Advisory Action dated Jul. 3, 2025 in related U.S. Appl. No. 18/021,496.

* cited by examiner

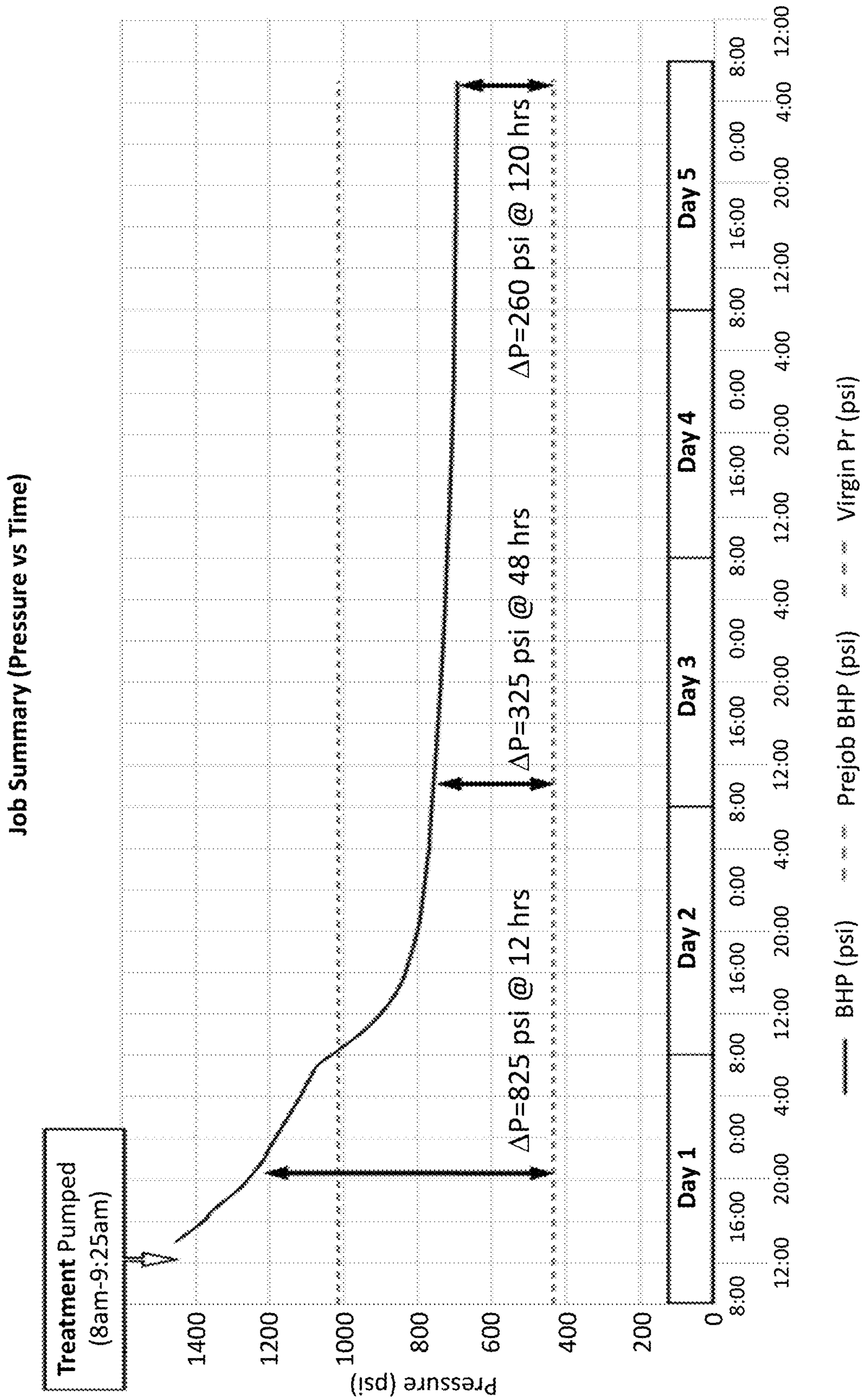
Job Summary (Pressure vs Time)
Treatment Pumped
(8am-9:25am)
Pressure (psi)
0
200
400
600
800
1000
1200
1400
ΔP=825 psi @ 12 hrs
ΔP=325 psi @ 48 hrs
ΔP=260 psi @ 120 hrs
Day 1
Day 2
Day 3
Day 4
Day 5
8:00
12:00
16:00
20:00
0:00
4:00
BHP (psi)
Prejob BHP (psi)
Virgin Pr (psi)

GAS GENERATING COMPOSITIONS AND USES

FIELD

The present disclosure is directed, in part, to hydrocarbon-bearing formation treatment fluid compositions and systems and the methods of their use in hydraulic fracturing hydrocarbon-bearing formations and/or mitigating well-to-well communication between an infill well(s) and adjacent offset wells.

BACKGROUND

Subterranean wells (e.g., hydrocarbon producing wells, gas producing wells, oil producing wells, and the like) are often stimulated by hydraulic fracturing treatments. In traditional hydraulic fracturing treatments, a treatment fluid, which may also function simultaneously or subsequently as a carrier fluid, is pumped into a portion of a subterranean formation (which may also be referred to herein simply as a "formation") at a rate and pressure sufficient to break down the formation and create one or more fractures therein. Typically, particulate solids, such as graded sand, are suspended in a portion of the treatment fluid and then deposited into the fractures. The particulate solids, known as "proppant particulates" (which may also be referred to herein as "proppant" or "propping particulates") prevent the fractures from fully closing once the hydraulic pressure is removed. By keeping the fractures from fully closing, the proppant particulates aid in forming conductive paths through which fluids produced from the formation flow, referred to as a "proppant pack."

Fracture complexity may be enhanced by stimulation (e.g., fracturing) operations to create new or enhance (e.g., elongate or widen) existing fractures. In such cases, the newly formed fractures may remain open without the assistance of proppant or micro-proppant particulates due to shear offset of the formation forming the fractures, or may have included therein proppant particulates, depending on the size of the fracture, to assist in keeping them open after hydraulic pressure is removed. The inclusion of proppant particulates in the fractures, new or natural, may increase the conductivity of a low permeability formation.

In some cases, subterranean treatment operations (e.g., stimulation, proppant placement, and the like), may be supplemented with enhanced hydrocarbon recovery techniques. Such enhanced oil recovery techniques may operate to enhance the conductivity of fractures. One such technique is acidizing, which involves injecting an acid (e.g., hydrochloric acid) into a subterranean formation in order to etch channels or create microfractures in the face of the formation and/or within an existing macrofracture or microfracture, thereby enhancing the conductivity of the formation. The acid may create a branched, dendritic-like network of channels through which produced fluids may flow.

SUMMARY

The present disclosure provides water-based hydraulic fracturing treatment fluid systems comprising a first component comprising metal proppants having a size from about 0.1 microns to about 2000 microns and a second component comprising an exergonic gas generating promoter.

The present disclosure also provides water-based hydraulic fracturing treatment fluid compositions comprising metal proppants having a size from about 0.1 microns to about 2000 microns and an exergonic gas generating agent.

The present disclosure also provides methods of hydraulic fracturing a hydrocarbon-bearing formation, the methods comprising injecting a water-based fluid into the formation and injecting metal proppants into the formation; and injecting an exergonic gas generating promoter into the formation; thereby generating a slow exergonic gas generation reaction downhole; or injecting a water-based fluid into the formation and mixing a first component comprising metal proppants with a second component comprising an exergonic gas generating promoter at the surface of the formation to form a composition, and injecting the composition into the formation; thereby generating a slow exergonic gas generation reaction downhole or in the formation.

The present disclosure also provides methods of mitigating well-to-well communication between an infill well and an adjacent offset well while hydraulically fracturing at least one infill well, the method comprising injecting chemicals into an adjacent offset well, wherein the chemicals produce a slow gas-generation reaction that pressurizes the depleted formation interval surrounding the adjacent off-set well.

BRIEF DESCRIPTION OF THE DRAWINGS

FIG. 1 shows post-treatment BHP of a pilot well over 5 days.

DESCRIPTION OF EMBODIMENTS

The embodiments described herein relate to generating and maintaining the conductivity of fractures in tight formation by generating gas. Specifically, the embodiments described herein relate to reacting a metal proppant and an exergonic gas-generating promoter within a fracture (e.g., a macrofracture or a microfracture) to produce gas sufficient to energize and pressurize at least one fracture therein. The gas may be generated in situ by delaying contact between the metal proppant and the exergonic gas-generating agent until reaching a desired interval or location downhole within a subterranean formation. Metal proppant particulates may be used to prop open the microfractures and the fractures.

Although some embodiments described herein are illustrated by reference to stimulation treatments (e.g., fracturing), the methods and compositions disclosed herein may be used in any subterranean formation operation that may benefit from their gas generating properties. Such treatment operations can include, but are not limited to, a drilling operation, a stimulation operation, a hydraulic stimulation operation, a sand control operation, a completion operation, a scale inhibiting operation, a water-blocking operation, a clay stabilizer operation, a fracturing operation, a frac-packing operation, a gravel packing operation, a wellbore strengthening operation, a sag control operation, or any combination thereof. Furthermore, the embodiments described herein may be used in full-scale subterranean operations or as treatment fluids. The subterranean formation may be any source rock comprising organic matter (e.g., oil or natural gas), such as shale, sandstone, or limestone and may be subsea.

Moreover, the methods and compositions described herein may be used in any non-subterranean operation that may benefit from their gas generating properties. Such operations may be performed in any industry including, but not limited to, oil and gas, mining, chemical, pulp and paper, aerospace, medical, automotive, and the like.

As used herein, the phrase "treatment fluid" refers to a relatively small volume of specially prepared fluid (e.g., drilling fluid) placed or circulated in a wellbore.

As used herein, the term "microfracture" refers to a natural or secondary discontinuity in a portion of a subterranean formation creating a flow channel.

As used herein, the term "microfracture" refers to a discontinuity in a portion of a subterranean formation creating a flow channel, the flow channel generally having a diameter or flow size opening greater than about the size of a microfracture. The microfractures and macrofractures may be channels, perforations, holes, or any other ablation within the formation.

As used herein, "about" means that the recited numerical value is approximate and small variations would not significantly affect the practice of the disclosed embodiments. Where a numerical value is used, unless indicated otherwise by the context, "about" means the numerical value can vary by ±10% and remain within the scope of the disclosed embodiments.

As used herein, "comprising" (and any form of comprising, such as "comprise", "comprises", and "comprised"), "having" (and any form of having, such as "have" and "has"), "including" (and any form of including, such as "includes" and "include"), or "containing" (and any form of containing, such as "contains" and "contain"), are inclusive and open-ended and include the options following the terms, and do not exclude additional, unrecited elements or method steps.

The present disclosure provides water-based hydraulic fracturing treatment fluid systems comprising a first component and a second component. The first component comprises metal proppants having a size from about 0.1 microns to about 2000 microns. The second component comprises an exergonic gas generating agent.

In some embodiments, one or both of the first component and the second component are suspended in an aqueous or non-aqueous solvent. In some embodiments, one or both of the first component and the second component are suspended in an aqueous solvent. In some embodiments, one or both of the first component and the second component are suspended in a non-aqueous solvent. Suitable examples of non-aqueous solvents include, but are not limited to: aromatic compounds, such as benzene and toluene; alcohols, such as methanol; esters; ethers; ketones, such as acetone; amines; nitrated and halogenated hydrocarbons; liquid ammonia; liquid sulfur dioxide; sulfuryl chloride and sulfuryl chloride fluoride; phosphoryl chloride; dinitrogen tetroxide; antimony trichloride; bromine pentafluoride; hydrogen fluoride; pure sulfuric acid; and other inorganic acids. In some embodiments, one or both of the first component and the second component are in a dry form.

The water-based hydraulic fracturing treatment fluid system may comprise any base fluid capable of being delivered to a subterranean formation. Suitable base fluids include, but not be limited to, oil-based fluids; aqueous-based fluids; aqueous-miscible fluids; water-in-oil emulsions; oil-in-water emulsions; and any combination thereof. Suitable oil-based fluids include, but are not limited to, alkanes, olefins, aromatic organic compounds, cyclic alkanes, paraffins, diesel fluids, mineral oils, desulfurized hydrogenated kerosenes, and any combination thereof. Suitable aqueous-based fluids include fresh water, saltwater (e.g., water containing one or more salts dissolved therein), brine (e.g., saturated salt water), seawater, and any combination thereof. Suitable aqueous-miscible fluids include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil and oil-in-water emulsions may comprise any water or oil component described herein. Suitable water-in-oil emulsions, also known as invert emulsions, may have an oil-to-water ratio from a lower limit of greater than about 50:50, greater than about 55:45, greater than about 60:40, greater than about 65:35, greater than about 70:30, greater than about 75:25, or greater than about 80:20 to an upper limit of less than about 100:0, less than about 95:5, less than about 90:10, less than about 85:15, less than about 80:20, less than about 75:25, less than about 70:30, or less than about 65:35 by volume in the base fluid, where the amount may range from any lower limit to any upper limit and encompass any subset therebetween. Suitable oil-in-water emulsions may have a water-to-oil ratio from a lower limit of greater than about 50:50, greater than about 55:45, greater than about 60:40, greater than about 65:35, greater than about 70:30, greater than about 75:25, or greater than about 80:20 to an upper limit of less than about 100:0, less than about 95:5, less than about 90:10, less than about 85:15, less than about 80:20, less than about 75:25, less than about 70:30, or less than about 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

In some embodiments, the metal proppants are aluminum proppants, silicon proppants, or iron proppants, or any combination thereof. In some embodiments, the metal proppants are aluminum proppants. In some embodiments, the metal proppants are silicon proppants. In some embodiments, the metal proppants are iron proppants. Additional metal proppants include, but are not limited to copper, lead, nickel, tin, and zinc.

In some embodiments, the metal proppants have a size from about 1 micron to about 150 microns, from about 5 microns to about 125 microns, from about 10 microns to about 100 microns, from about 20 microns to about 80 microns, from about 25 microns to about 75 microns, or from about 40 microns to about 60 microns. In some embodiments, the metal proppants have a size from about 1 micron to about 150 microns. In some embodiments, the metal proppants have a size from about 5 microns to about 125 microns. In some embodiments, the metal proppants have a size from about 10 microns to about 100 microns. In some embodiments, the metal proppants have a size from about 20 microns to about 80 microns. In some embodiments, the metal proppants have a size from about 25 microns to about 75 microns. In some embodiments, the metal proppants have a size from about 40 microns to about 60 microns. In some embodiments, the aluminum proppants are atomized aluminum powder having an average or median particle size of 100 microns or less.

In some embodiments, metal proppants are particulates capable of holding fractures (e.g., microfractures) open after a hydraulic fracturing treatment and having a size in the range of from a lower limit of about 0.1 μm, about 0.5 μm, about 1 μm, about 5 μm, about 10 μm, about 20 μm, about 30 μm, about 40 μm, about 50 μm, about 60 μm, about 70 μm, about 80 μm, about 90 μm, about 100 μm, about 110 μm, about 120 μm, about 130 μm, about 140 μm, about 150 μm, about 200 μm, about 300 μm, or about 400 μm to an upper limit of about 500 μm, about 600 μm, about 700 μm, about 800 μm, about 900 μm, about 1000 μm, about 1100 μm, about 1200 μm, about 1300 μm, about 1400 μm, about 1500 μm, about 1600 μm, about 1700 μm, about 1800 μm, about 1900 μm, or about 2000 lam.

The metal proppant particulates for use in the water-based hydraulic fracturing treatment fluid system and fracturing fluids described herein may be any material capable of propping open a fracture after hydraulic pressure is removed. Suitable materials for these metal proppant particulates include, but are not limited to, sand; bauxite; ceramic material; glass material; polymeric material (e.g., ethylene-vinyl acetate or composite materials); polytetrafluoroethylene material; nut shell pieces; a cured resinous particulate comprising nut shell pieces; seed shell pieces; a cured resinous particulate comprising seed shell pieces; fruit pit pieces; a cured resinous particulate comprising fruit pit pieces; wood; composite particulates; and any combination thereof. Suitable composite particulates may comprise a binder and a filler material, wherein suitable filler materials include, but are not limited to, silica; alumina; fumed carbon; carbon black; graphite; mica; titanium dioxide; barite; meta-silicate; calcium silicate; kaolin; talc; zirconia; boron; fly ash; hollow glass microspheres; solid glass; and any combination thereof. Suitable metal proppant particulates for use in conjunction with the embodiments described herein may be any known shape of material, including substantially spherical materials; fibrous materials; polygonal materials (e.g., cubic materials); and any combinations thereof.

In some embodiments, the metal proppant particulates may be present in the water-based hydraulic fracturing treatment fluid system in an amount in the range of from a lower limit of about 0.01 pounds per gallon ("lb/gal"), about 0.025 lb/gal, about 0.05 lb/gal, about 0.075 lb/gal, about 0.1 lb/gal, about 0.125 lb/gal, about 0.15 lb/gal, about 0.175 lb/gal, about 0.2 lb/gal, about 0.225 lb/gal, or about 0.25 lb/gal to an upper limit of about 0.5 lb/gal, about 0.475 lb/gal, about 0.45 lb/gal, about 0.425 lb/gal, about 0.4 lb/gal, about 0.375 lb/gal, about 0.35 lb/gal, about 0.325 lb/gal, about 0.3 lb/gal, about 0.275 lb/gal, or about 0.25 lb/gal of the water-based hydraulic fracturing treatment fluid system. In some embodiments, the metal proppant particulates may be present in the water-based hydraulic fracturing treatment fluid system in an amount in the range of from a lower limit of about 0.1 lb/gal, about 0.5 lb/gal, about 1 lb/gal, about 1.5 lb/gal, about 2 lb/gal, about 2.5 lb/gal, or about 3 lb/gal to an upper limit of about 6 lb/gal, about 5.5 lb/gal, about 5 lb/gal, about 4.5 lb/gal, about 4 lb/gal, about 3.5 lb/gal, or about 3 lb/gal of the water-based hydraulic fracturing treatment fluid system.

In some embodiments, the exergonic gas generating promoter is a hydroxide promoter, a metal oxide promoter, an acid, or a salt promoter, or any combination thereof. In some embodiments, the exergonic gas generating promoter is a hydroxide promoter. In some embodiments, the exergonic gas generating promoter is a metal oxide promoter. In some embodiments, the exergonic gas generating promoter is an acid. In some embodiments, the exergonic gas generating promoter is a salt promoter.

In some embodiments, the hydroxide promoter is $Ca(OH)_2$, $Mg(OH)_2$, NaOH, or KOH, or any combination thereof. In some embodiments, the hydroxide promoter is $Ca(OH)_2$. In some embodiments, the hydroxide promoter is $Mg(OH)_2$. In some embodiments, the hydroxide promoter is NaOH. In some embodiments, the hydroxide promoter is KOH. In some embodiments, the hydroxide promoter is $Mg(OH)_2$ or $Ca(OH)_2$, or a combination thereof. Additional hydroxide promoters include, but are not limited to, ammonia, barium hydroxide, chromium acetate hydroxide, chromium(III) hydroxide, cobalt(II) hydroxide, cobalt(III) hydroxide, copper(I) hydroxide, copper(II) carbonate, copper(II) hydroxide, curium hydroxide, gold(III) hydroxide, lead(II) hydroxide, lead(IV) hydroxide, iron(II) hydroxide, iron(III) oxide-hydroxide, tin(II) hydroxide, uranyl hydroxide, zinc hydroxide, zirconium(IV) hydroxide, mercury(II) hydroxide, and nickel(II) hydroxide, or any combination thereof.

In some embodiments, the metal oxide promoter is CaO or $Al_2O_3$, or a combination thereof. In some embodiments, the metal oxide promoter is CaO. In some embodiments, the metal oxide promoter is $Al_2O_3$. In some embodiments, the metal oxide promoter is $Al_2O_3$ (powder). Additional metal oxide promoters include, but are not limited to, copper(II) oxide, sodium oxide, potassium oxide, and magnesium oxide, or any combination thereof.

In some embodiments, the salt promoter is NaCl, KCl, $CaCl_2$, or $MgCl_2$, or any combination thereof. In some embodiments, the salt promoter is NaCl. In some embodiments, the salt promoter is KCl. In some embodiments, the salt promoter is $CaCl_2$. In some embodiments, the salt promoter is $MgCl_2$. Additional salt promoters include, but are not limited to, sodium bisulfate, copper sulfate, potassium dichromate, ammonium dichlorate, magnesium sulfate, sodium bicarbonate, or any combination thereof.

In some embodiments, the exergonic gas generating promoter is in an amount from about 0.001% (wt) to about 50% (wt), from about 0.01% (wt) to about 50% (wt), from about 0.1% (wt) to about 50% (wt), or from about 1.0% (wt) to about 50% (wt) of the metal proppants. In some embodiments, the exergonic gas generating promoter is in an amount from about 0.001% (wt) to about 50% (wt) of the metal proppants. In some embodiments, the exergonic gas generating promoter is in an amount from about 0.01% (wt) to about 50% (wt) of the metal proppants. In some embodiments, the exergonic gas generating promoter is in an amount from about 0.1% (wt) to about 50% (wt) of the metal proppants. In some embodiments, the exergonic gas generating promoter is in an amount from about 1.0% (wt) to about 50% (wt) of the metal proppants. In some embodiments, the exergonic gas generating promoter is in an amount from about 0.1% (wt) to about 10% (wt) or from about 0.1% (wt) to about 5% (wt) of the metal proppants. In some embodiments, the exergonic gas generating promoter is in an amount from about 0.1% (wt) to about 10% (wt) of the metal proppants. In some embodiments, the exergonic gas generating promoter is in an amount from about 0.1% (wt) to about 5% (wt) of the metal proppants.

The exergonic gas generating promoter for use in conjunction with any of the embodiments described herein may be any chemical capable of producing gas (such as hydrogen gas) in a subterranean formation when the metal proppant (such as Al powder) reacts with water. In some embodiments, the exergonic gas generating promoter is in the form of a solid particulate. The exergonic gas generating promoter may generate nitrogen and ammonia, wherein a greater amount of nitrogen is generated than ammonia. When an exergonic gas generating promoter is selected that contains an amide group, nitrogen may be produced with lesser amounts of ammonia, carbon dioxide, and carbon monoxide being produced. In other embodiments, the exergonic gas generating promoter may generate carbon dioxide.

Suitable nitrogen producing exergonic gas generating promoters include, but are not limited to, an azo-based compound; and a hydrazide-based compound; or any combination thereof. Examples of suitable azo-based and hydrazide-based compounds include, but are not limited to, hydrazine; azodicarbonamide; azobis (isobutyronitrile); p-toluene sulfonyl hydrazide; p-toluene sulfonyl semicarbazide; carbonhydrazide; and p-p' oxybis (benzenesulfonylhydrazide). Of these, azodicarbonamide and carbonhydrazide are most suitable. Nitrogen producing exergonic gas generating promoters that do not contain an azo-based or a hydrazide-based compound may also be used, and include, but are not limited to, ammonium salts of organic acids; ammonium salts of inorganic acids; hydroxylamine sulfate; carbamide; and any combinations thereof. Suitable carbon dioxide producing exergonic gas generating agents include, but are not limited to, an acidic salt of an alkali metal; a neutral salt of an alkali metal; an acidic salt of an alkaline earth metal; a neutral salt of an alkaline earth metal; organic acids; and inorganic acids; or any combination thereof.

In some embodiments, the exergonic gas generating promoter may be formed by two components. The first component of the exergonic gas generating promoter may be an ammonium-containing compound and the second component of the exergonic gas generating promoter may be a nitrite-containing compound. The ammonium-containing compound and the nitrite-containing compound may react to generate nitrogen gas. In some embodiments, the exergonic gas generating promoter may be introduced into the subterranean formation in a separate fluid (separate from the metal proppant) to delay the generation of the gas. Suitable ammonium-containing compounds include, but are not limited to, ammonium chloride; ammonium bromide; ammonium nitrate; ammonium sulfate; ammonium carbonate; ammonium hydroxide; ammonium acetate; ammonium borates; ammonium chromate; ammonium dichromate; ammonium cyanides; ammonium glutamate; ammonium molybdate; ammonium oxalate; ammonium phosphate dibasic; ammonium phosphate monobasic; ammonium sulfamate; and ammonium thiosulfate; or any combination thereof. Suitable nitrite-containing compounds include, but are not limited to, sodium hypochlorite; sodium nitrite; and potassium nitrate; or any combination thereof. In some embodiments, the ammonium-containing compound is ammonium chloride, and the nitrite-containing compound is sodium nitrite. In some embodiments, the first component and the second component may be present in a ratio between about 1:1, about 1:2, about 1:3, about 1:4, about 1:5, about 1:6, about 1:7, about 1:8, about 1:9, or about 1:10 to about 1:20, about 1:19, about 1:18, about 1:17, about 1:16, about 1:15, about 1:14, about 1:13, about 1:12, about 1:11, or about 1:10.

In some embodiments, the exergonic gas generating promoter may be present such that the water-based hydraulic fracturing treatment fluid system (including either the first and/or second component) may exhibit a gas in the range from a lower limit of about 5%, about 10%, about 25%, about 40%, about 50%, about 60%, or about 70% to an upper limit of about 95%, about 90%, about 80%, about 75%, about 60%, or about 50% gas volume, and wherein the gas quality may range from any lower limit to any upper limit and encompass any subset therebetween. The water-based hydraulic fracturing treatment fluid system may have a gas quality from about 60% to about 95%, or about 70% to about 95%. Typically, the gas-generating chemical is present in an amount ranging from a lower limit of about 75%, about 75.5%, about 76%, about 76.5%, about 77%, about 77.5%, about 78%, about 78.5%, about 79%, about 79.5%, and about 80% to an upper limit of about 85%, about 84.5%, about 84%, about 83.5%, about 83%, about 82.5%, about 82%, about 81.5%, about 81%, about 80.5%, and about 80% by volume of the water-based hydraulic fracturing treatment fluid system.

The exergonic gas generating promoters described herein may be capable of causing, or "activating," the exergonic gas generation upon encountering the metal proppant and water, and particular stimuli, such as, for example, temperature, pH, salinity, the passage of time, and the like. Suitable exergonic gas generating promoters include, but are not limited to, an alkali metal-containing material, and an alkaline earth metal-containing compound, or any combination thereof. Examples of suitable alkali metal- and alkaline metal-containing exergonic gas generating promoters include, but are not limited to, carbonate; hydroxide; lithium salt; sodium salt; persulfate; perborate; hypochlorite; hypobromite; chlorite; chlorate; iodate; bromate; chloroaurate; arsenate; antimonite; and molybate anion, or any combination thereof. Oxidizing agents of alkali metal- and alkaline metal-containing materials include, but are not limited to, ammonium persulfate; sodium persulfate; potassium persulfate; sodium chlorate; sodium chlorate; hydrogen peroxide; sodium perborate; and sodium peroxy carbonate, or any combination thereof.

In some embodiments, the exergonic gas generating promoter is present in the water-based hydraulic fracturing treatment fluid system (including the first and/or second component) in a range from a lower limit of about 0.01%, about 0.05%, about 0.1%, about 0.5%, about 1%, about 2.5%, about 5%, about 7.5%, about 10%, and about 12.5% (wt) to an upper limit of about 25%, about 22.5%, about 20%, about 17.5%, about 15%, and about 12.5% (wt) of the metal proppant. In some embodiments, the exergonic gas generating promoter is present in a range from about 1% to about 10% (wt) of the metal proppant.

In some embodiments, the water-based hydraulic fracturing treatment fluid systems further comprise a friction reducer, a gum, a polymer, a proppant, a scale inhibitor, an oxygen scavenger, an iron controller, a crosslinker, a corrosion inhibitor, a breaker, a surfactant, a de-emulsifier, a biocide, an acid, or a clay control agent, or any combination thereof. In some embodiments, the water-based hydraulic fracturing treatment fluid systems further comprise a friction reducer. In some embodiments, the water-based hydraulic fracturing treatment fluid systems further comprise a gum. In some embodiments, the water-based hydraulic fracturing treatment fluid systems further comprise a polymer. In some embodiments, the water-based hydraulic fracturing treatment fluid systems further comprise a proppant. In some embodiments, the water-based hydraulic fracturing treatment fluid systems further comprise a scale inhibitor. In some embodiments, the water-based hydraulic fracturing treatment fluid systems further comprise an oxygen scavenger. In some embodiments, the water-based hydraulic fracturing treatment fluid systems further comprise an iron controller. In some embodiments, the water-based hydraulic fracturing treatment fluid systems further comprise a crosslinker. In some embodiments, the water-based hydraulic fracturing treatment fluid systems further comprise a corrosion inhibitor. In some embodiments, the water-based hydraulic fracturing treatment fluid systems further comprise a breaker. In some embodiments, the water-based hydraulic fracturing treatment fluid systems further comprise a surfactant. In some embodiments, the water-based hydraulic fracturing treatment fluid systems further comprise a de-emulsifier. In some embodiments, the water-based hydraulic fracturing treatment fluid systems further comprise a biocide. In some embodiments, the water-based hydraulic fracturing treatment fluid systems further comprise an acid. In some embodiments, the water-based hydraulic fracturing treatment fluid systems further comprise a clay control agent.

In some embodiments, the water-based hydraulic fracturing treatment fluid system may further comprise a gelling agent. The gelling agent may be any substance (e.g., a polymeric material) capable of increasing the viscosity of the water-based hydraulic fracturing treatment fluid system. In some embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents; synthetic gelling agents; and any combination thereof. Suitable gelling agents include, but are not limited to, a polysaccharide; a biopolymer; and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, a guar gum (e.g., hydroxyethyl guar, hydroxypropyl guar, carboxymethyl guar, carboxymethyl hydroxyethyl guar, and carboxymethylhydroxypropyl guar); a cellulose; a cellulose derivative (e.g., hydroxyethyl cellulose, carboxyethylcellulose, carboxymethylcellulose, and carboxymethylhydroxyethylcellulose); xanthan; scleroglucan; succinoglycan; diutan; and any combination thereof.

Suitable synthetic polymers for use as gelling agents include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamido-alkyl trialkyl ammonium salts; methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyl dimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof and any combination thereof. In some embodiments, the gelling agent comprises an acrylamide/2-(methacryloyloxy) ethyltrimethylammonium methyl sulfate copolymer. In some embodiments, the gelling agent may comprise an acrylamide/2-(methacryloyloxy)ethyltrimethylammonium chloride copolymer. In other embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the water-based hydraulic fracturing treatment fluid system of the embodiments described herein in an amount sufficient to provide the desired viscosity. In some embodiments, the gelling agents (i.e., the polymeric material) may be present in an amount in the range of from a lower limit of about 0.1%, about 0.25%, about 0.5%, about 0.75%, about 1%, about 1.25%, about 1.5%, about 1.75%, about 2%, about 2.25%, about 2.5%, about 2.75%, about 3%, about 3.25%, about 3.5%, about 3.75%, about 4%, about 4.25%, about 4.5%, about 4.75%, or about 5% (wt) to an upper limit of about 10%, about 9.75%, about 9.5%, about 9.25%, about 9%, about 8.75%, about 8.5%, about 8.25%, about 8%, about 7.75%, about 7.5%, about 7.25%, about 7%, about 6.75%, about 6.5%, about 6.25%, about 6%, about 5.75%, about 5.5%, about 5.25%, and about 5% (wt) of the treatment fluid. In some embodiments, the gelling agent is present in an amount in the range of from about 0.15% to about 2.5% (wt) of the water-based hydraulic fracturing treatment fluid system.

In those embodiments described herein where it is desirable to crosslink the gelling agent(s), the water-based hydraulic fracturing treatment fluid system may comprise one or more crosslinking agents. The crosslinking agents may comprise a borate ion, a metal ion, or similar component that is capable of crosslinking at least two molecules of the gelling agent. Examples of suitable crosslinking agents include, but are not limited to, a borate ion; a magnesium ion; a zirconium IV ion; a titanium IV ion; an aluminum ion; an antimony ion; a chromium ion; an iron ion; a copper ion; a magnesium ion; a zinc ion; and any combination thereof. These ions may be provided by providing any compound that is capable of producing one or more of these ions. Examples of such compounds include, but are not limited to, ferric chloride; boric acid; disodium octaborate tetrahydrate; sodium diborate; a pentaborate; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; an antimony compound; a chromium compound; an iron compound; a copper compound; a zinc compound; and any combination thereof. In some embodiments, the crosslinking agent may be formulated to remain inactive until it is “activated” by, among other things, certain conditions in the treatment fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited, the type of gelling agent(s) selected, the molecular weight of the gelling agent(s) selected, the conditions in the subterranean formation being treated, the safety handling requirements, the pH of the water-based hydraulic fracturing treatment fluid system, the temperature of the subterranean formation, the desired delay for the crosslinking agent to crosslink the gelling agent molecules, and the like.

When included, suitable crosslinking agents may be present in the water-based hydraulic fracturing treatment fluid system useful in the embodiments described herein in an amount sufficient to provide the desired degree of crosslinking between molecules of the gelling agent. In some embodiments, the crosslinking agent may be present in an amount in the range of from a lower limit of about 0.005%, about 0.05%, about 0.1%, about 0.15%, about 0.2%, about 0.25%, about 0.3%, about 0.35%, about 0.4%, about 0.45%, or about 0.5% to an upper limit of about 1%, about 0.95%, about 0.9%, about 0.85%, about 0.8%, about 0.75%, about 0.7%, about 0.65%, about 0.6%, about 0.55%, or about 0.5% (wt) of the water-based hydraulic fracturing treatment fluid system. In some embodiments, the crosslinking agent may be present in an amount in the range of from about 0.05% to about 1% (wt) of the water-based hydraulic fracturing treatment fluid system. One of ordinary skill in the art, with the benefit of this disclosure, will recognize the appropriate amount of crosslinking agent to include in a water-based hydraulic fracturing treatment fluid system of the embodiments described herein based on a number of factors, such as the temperature conditions of a particular application, the type of gelling agents selected, the molecular weight of the gelling agents, the desired degree of viscosification, the pH of the treatment fluid, and the like.

In some embodiments, the water-based hydraulic fracturing treatment fluid systems further comprise a third component comprising a wettability modifier. In some embodiments, the third component comprising the wettability modifier is present within the first component. In some embodiments, the third component comprising the wettability modifier is present within the second component. In some embodiments, the third component comprising the wettability modifier is separate from both the first component and the second component.

In some embodiments, the wettability modifier is in an amount from about 1 to about 20 gallons, from about 2 to about 15 gallons, from about 5 to about 120 gallons, or from about 8 to about 10 gallons, per 1000 gallons of treatment fluid. In some embodiments, the wettability modifier is in an amount from about 1 to about 20 gallons per 1000 gallons of treatment fluid. In some embodiments, the wettability modifier is in an amount from about 2 to about 15 gallons per 1000 gallons of treatment fluid. In some embodiments, the wettability modifier is in an amount from about 5 to about 120 gallons per 1000 gallons of treatment fluid. In some embodiments, the wettability modifier is in an amount from about 8 to about 10 gallons per 1000 gallons of treatment fluid.

In some embodiments, the wettability modifier is a nanofluid, a micro emulsion, a nano emulsion, a polymer, a fluorinated material, a silane, or a surfactant, or any combination thereof. In some embodiments, the wettability modifier is a nanofluid. In some embodiments, the wettability modifier is a micro emulsion. In some embodiments, the wettability modifier is a nano emulsion. In some embodiments, the wettability modifier is a polymer. In some embodiments, the wettability modifier is a polymer. In some embodiments, the wettability modifier is a fluorinated material. In some embodiments, the wettability modifier is a silane. In some embodiments, the wettability modifier is a surfactant.

In some embodiments, the wettability modifier is a silica, an alumina, or a titania nano-dispersion. In some embodiments, the wettability modifier is a silica nano-dispersion. In some embodiments, the wettability modifier is an alumina nano-dispersion. In some embodiments, the wettability modifier is a titania nano-dispersion.

In some embodiments, the wettability modifier is an anionic, nano-ionic, or cationic siloxane surfactant or fluorosurfactant. In some embodiments, the wettability modifier is an anionic siloxane surfactant or fluorosurfactant. In some embodiments, the wettability modifier is nano-ionic siloxane surfactant or fluorosurfactant. In some embodiments, the wettability modifier is a cationic siloxane surfactant or fluorosurfactant.

In some embodiments, the polymer is a fluoropolymer. In some embodiments, the fluoropolymer is polytetrafluoroethylene (PTFE).

The present disclosure also provides water-based hydraulic fracturing treatment fluid compositions comprising any of the first components and second components described herein. In some embodiments, the water-based hydraulic fracturing treatment fluid compositions further comprise any of the third components described herein. In some embodiments, the water-based hydraulic fracturing treatment fluid compositions can be formed at the surface of a hydrocarbon-bearing formation by mixing the first and second components, or by mixing the first, second, and third components. In some embodiments, the water-based hydraulic fracturing treatment fluid compositions can be formed inside a hydrocarbon-bearing formation by injecting the first and second components, or by injecting the first, second, and third components into a hydrocarbon-bearing formation.

The present disclosure also provides methods of hydraulic fracturing a hydrocarbon-bearing formation, the methods comprising: injecting a water-based fluid into the formation and injecting metal proppants into the formation; and injecting an exergonic gas generating promoter into the formation; thereby generating a slow exergonic gas generation reaction downhole.

The present disclosure also provides methods of hydraulic fracturing a hydrocarbon-bearing formation, the methods comprising: injecting a water-based fluid into the formation and mixing a first component comprising metal proppants with a second component comprising an exergonic gas generating promoter at the surface of the formation to form a composition, and injecting the composition into the formation; thereby generating a slow exergonic gas generation reaction downhole.

The increased pressure as a result of the gas released from the reaction of the metal proppants and exergonic gas generating promoter may overcome the tensile strength of the formation, thereby leading to the formation or extension of microfractures. Thereafter, a fracturing fluid comprising a fracturing base fluid and macro-proppant particulates may be introduced into the subterranean formation so as to place the proppant particulates within the fracture and form a proppant pack therein. The proppant pack may be formed by both the micro-proppant particulates and the macro-proppant particulates.

In any of the methods of hydraulic fracturing a hydrocarbon-bearing formation described herein, any of the first components (or metal proppants) and/or second components (exergonic gas generating promoters) described herein can used. In any of the methods of hydraulic fracturing a hydrocarbon-bearing formation described herein, any of the friction reducers, gums, polymers, proppants, scale inhibitors, oxygen scavengers, iron controllers, crosslinkers, corrosion inhibitors, breakers, surfactants, de-emulsifiers, biocides, acids, or clay control agents, or any combinations thereof, can also be injected into the formation.

In some embodiments, the metal proppants (or first component comprising the metal proppants) are injected into the formation prior to injecting the exergonic gas generating promoter (or second component comprising the exergonic gas generating promoter). In some embodiments, the metal proppants (or first component comprising the metal proppants) are injected into the formation after injecting the exergonic gas generating promoter (or second component comprising the exergonic gas generating promoter). In some embodiments, the metal proppants (or first component comprising the metal proppants) and the exergonic gas generating promoter (or second component comprising the exergonic gas generating promoter) are mixed while injecting both components at about the same time.

In some embodiments, the metal proppants (or first component comprising the metal proppants) and the exergonic gas generating promoter (or second component comprising the exergonic gas generating promoter) is injected into the formation prior to or at about the same time as injecting a proppant-laden slurry.

In some embodiments, the amount of the metal proppants injected into the formation is less than about 10% (wt) or less than about 1% (wt) of the total treatment fluid injected into the formation. In some embodiments, the amount of the metal proppants injected into the formation is less than about 10% (wt) of the total treatment fluid injected into the formation. In some embodiments, the amount of the metal proppants injected into the formation is less than about 1% (wt) of the total treatment fluid injected into the formation.

In some embodiments, the amount of the exergonic gas generating promoter injected into the formation is from about 1 to about 5% (wt) of the metal proppants injected into the formation. In some embodiments, the amount of the exergonic gas generating promoter injected into the formation is about 1% (wt) of the metal proppants injected into the formation. In some embodiments, the amount of the exergonic gas generating promoter injected into the formation is about 2% (wt) of the metal proppants injected into the formation. In some embodiments, the amount of the exergonic gas generating promoter injected into the formation is about 3% (wt) of the metal proppants injected into the formation. In some embodiments, the amount of the exergonic gas generating promoter injected into the formation is about 4% (wt) of the metal proppants injected into the formation. In some embodiments, the amount of the exergonic gas generating promoter injected into the formation is about 5% (wt) of the metal proppants injected into the formation.

In some embodiments, the methods described herein further comprise injecting a wettability modifier (or a third component comprising a wettability modifier) into the formation. In any of the methods of hydraulic fracturing a hydrocarbon-bearing formation described herein, any of the wettability modifiers (or third component comprising the wettability modifier) described herein can be used.

In some embodiments, the wettability modifier (or third component comprising the wettability modifier) is mixed with the metal proppants (or first component comprising the metal proppants) and/or the exergonic gas generating promoter (or second component comprising the exergonic gas generating promoter) at the surface of the formation to form a composition, prior to injecting the composition into the formation.

In some embodiments, the reaction between the metal proppant and the exergonic gas generating promoter may be delayed by introducing the metal proppant and the exergonic gas generating promoter into the subterranean formation in separate fluids. For example, in some embodiments, the method comprising injecting a water-based fluid into the formation and injecting metal proppants into the formation, and injecting an exergonic gas generating promoter into the formation, thereby generating a slow exergonic gas generation reaction downhole. The metal proppants particulates may be placed into the fracture, along with the exergonic gas generating promoter. In some embodiments, the metal proppants particulates may be placed into the far reaches of a macrofracture, which may be very small, or within a microfracture to prop open portions or all of those fractures after hydraulic pressure is removed. The exergonic gas generating promoter may thereafter be introduced into the subterranean formation. The metal proppant particulates and the exergonic gas generating promoter may then contact one another within the fracture and react together so as to generate gas. In some embodiments, the exergonic gas generating promoter may be placed into the far reaches of a macrofracture, which may be very small, or within a microfracture to prop open portions or all of those fractures after hydraulic pressure is removed. The metal proppant particulates may thereafter be introduced into the subterranean formation. The metal proppant particulates and the exergonic gas generating promoter may then contact one another within the fracture and react together so as to generate gas. The increased pressure as a result of the gas released from the reaction of the exergonic gas generating promoter and metal proppant particulates may overcome the tensile strength of the formation, thereby leading to the formation or extension of microfractures. Thereafter, a water-based fluid may be introduced into the subterranean formation so as to place the metal proppant particulates within the fracture and form a proppant pack therein. In some embodiments, the water-based fluid may comprise metal proppants and not the exergonic gas generating promoter. In some embodiments, the water-based fluid may comprise the exergonic gas generating promoter and not the metal proppants. In some embodiments, the water-based fluid may be introduced into the subterranean formation at the same pressure as the metal proppants (i.e., above the fracture gradient). In some embodiments, the water-based fluid may be introduced into the subterranean formation at the same pressure as the exergonic gas generating promoter (i.e., above the fracture gradient). In some embodiments, the steps of introducing the exergonic gas generating promoter, the metal proppants, and the water-based fluid may be repeated at a second treatment interval and up to as many treatment intervals as are present in a subterranean formation, depending on the operations being performed.

In some embodiments, the first component and/or the second component may be introduced into the subterranean formation at a rate and pressure sufficient to create or enhance the at least one fracture in the first treatment interval. In some embodiments, the water-based hydraulic fracturing treatment fluid system (including the first component and second component) and/or the water-based fluid may be introduced into the subterranean formation using a hydrojetting tool. The hydrojetting tool may be connected to a tubular member and have a hydrojetting nozzle. The hydrojetting tool may be configured such that fluid flowed therethrough and out the hydrojetting nozzle may be at a pressure sufficient to create or enhance a fracture in a subterranean formation. In some embodiments, the first component and/or the second component may be introduced into the subterranean formation through the hydrojetting tool and out the hydrojetting nozzle at a rate and pressure sufficient to create the at least one fracture.

The tubular member of the hydrojetting tool may be within the subterranean formation such that an annulus is formed between the tubular member and the subterranean formation. In some embodiments, either the first component and/or the second component or the water-based fluid may be introduced into the subterranean formation through the hydrojetting tool and the other of the first component and/or the second component or the water-based fluid may be introduced into the subterranean formation through the annulus. In other embodiments, the water-based fluid may be introduced through the hydrojetting tool, followed immediately by introduction of the first component and/or the second component through the same hydrojetting tool. In those embodiments in which a first component and a second component are used, one of the first components or the second components may be introduced into the subterranean through the hydrojetting tool and the other of the first component or the second component may be introduced into the subterranean formation through the annulus. The water-based fluid may then be introduced either through the annulus or through the same hydrojetting tool.

In various embodiments, systems configured for delivering the treatment fluids (i.e., water-based hydraulic fracturing treatment fluid system (including the first and second components) and the water-based fluid) described herein to a downhole location are described. In various embodiments, the systems can comprise a pump fluidly coupled to a tubular, the tubular containing the treatment fluids described herein. It will be appreciated that while the system described below may be used for delivering either or both of the temporary sealant slurry and the fracturing fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the water-based hydraulic fracturing treatment fluid system to a subterranean formation at or above a fracture gradient of the subterranean formation, but it may also be used in cases where fracturing is not desired. In some embodiments, the high pressure pump may be capable of fluidly conveying particulate matter, such as the metal proppant particulates and/or the exergonic gas generating promoters described herein, into the subterranean formation. Suitable high pressure pumps include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the water-based hydraulic fracturing treatment fluid system to the high pressure pump. In such embodiments, the low pressure pump may "step up" the pressure of the water-based hydraulic fracturing treatment fluid system before reaching the high pressure pump.

In some embodiments, the systems described herein can further comprise a mixing tank that is upstream of the pump and in which the water-based hydraulic fracturing treatment fluid system is formulated. In various embodiments, the pump (e.g., a low pressure pump, a high pressure pump, or a combination thereof) may convey the water-based hydraulic fracturing treatment fluid system from the mixing tank or other source of the water-based hydraulic fracturing treatment fluid system to the tubular. In other embodiments, however, the water-based hydraulic fracturing treatment fluid system may be formulated offsite and transported to a worksite, in which case the water-based hydraulic fracturing treatment fluid system may be introduced to the tubular via the pump directly from its shipping container (e.g., a truck, a railcar, a barge, or the like) or from a transport pipeline. In either case, the water-based hydraulic fracturing treatment fluid system may be drawn into the pump, elevated to an appropriate pressure, and then introduced into the tubular for delivery downhole.

It is also to be recognized that the disclosed water-based hydraulic fracturing treatment fluid systems may also directly or indirectly affect the various downhole equipment and tools that may come into contact with the water-based hydraulic fracturing treatment fluid system during operation. Such equipment and tools include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The present disclosure also provides methods of mitigating well-to-well communication between an infill well and an adjacent offset well while hydraulically fracturing at least one infill well. The methods comprise injecting chemicals into an adjacent offset well, wherein the chemicals produce a slow gas-generation reaction that pressurizes the depleted formation interval surrounding the adjacent off-set well.

In some embodiments, the methods comprise: injecting a first component into an adjacent offset well, wherein the first component comprises metal proppants; and injecting a second component into the adjacent offset well, wherein the second component comprises an exergonic gas generating promoter, thereby generating a slow exergonic gas reaction in situ wherein the generated gas pressurizes the depleted subterranean formation.

The increased pressure as a result of the gas released from the reaction of metal proppants and water in the presence of an exergonic gas generating promoter may overcome the tensile strength of the formation, thereby leading to the formation or extension of microfractures. Thereafter, a fracturing fluid comprising a fracturing base fluid and macroproppant particulates may be introduced into the subterranean formation so as to place the proppant particulates within the fracture and form a proppant pack therein. The proppant pack may be formed by both the micro-proppant particulates and the macro-proppant particulates. The increased pressure as a result of the gas released from the reaction of metal proppants and water in the presence of an exergonic gas generating promotor may increase the regional pressure inside the fractures, thereby leading to enhancing fluids recovery.

In some embodiments, the methods further comprise injecting a water-based fluid into the adjacent offset well prior to injecting the first and second components into the adjacent offset well.

In some embodiments, the methods further comprise hydraulic fracturing the at least one infill well.

In any of the mitigating methods described herein, any of the first components (or metal proppants) and/or second components (exergonic gas generating promoters) described herein can used. In any of the mitigating methods described herein, any of the friction reducers, gums, polymers, proppants, scale inhibitors, oxygen scavengers, iron controllers, crosslinkers, corrosion inhibitors, breakers, surfactants, de-emulsifiers, biocides, acids, or clay control agents, or any combinations thereof, can also be used.

In some embodiments, the water-based fluid, the metal proppants (or first component comprising the metal proppants) and the exergonic gas generating promoter (or second component comprising the exergonic gas generating promoter) are injected into the adjacent offset well at least one day prior to hydraulic fracturing the at least one infill well.

In some embodiments, the adjacent offset well is injected with the water, the metal proppants (or first component comprising the metal proppants) and the exergonic gas generating promoter (or second component comprising the exergonic gas generating promoter) during the hydraulic fracturing of the at least one infill well.

In some embodiments, the injection rate of the water, metal proppants (or first component comprising the metal proppants) and/or the exergonic gas generating promoter (or second component comprising the exergonic gas generating promoter) is from about 0.1 bbl/min to about 30 bbl/min, from about 1.0 bbl/min to about 25 bbl/min, from about 5.0 bbl/min to about 20 bbl/min, or from about 10.0 bbl/min to about 15 bbl/min. In some embodiments, the injection rate is from about 0.1 bbl/min to about 30 bbl/min. In some embodiments, the injection rate is from about 1.0 bbl/min to about 25 bbl/min. In some embodiments, the injection rate is from about 5.0 bbl/min to about 20 bbl/min. In some embodiments, the injection rate is from about 10.0 bbl/min to about 15 bbl/min. In some embodiments, the injection rate is from about 0.5 bbl/min to about 10 bbl/min.

In some embodiments, the amount of the metal proppants (or first component comprising the metal proppants) injected into the adjacent offset well is less than about 10% (wt) or less than about 1% (wt) of the total treatment fluid injected into the adjacent offset well. In some embodiments, the amount of the metal proppants (or first component comprising the metal proppants) injected into the adjacent offset well is less than about 10% (wt) of the total treatment fluid injected into the adjacent offset well. In some embodiments, the amount of the metal proppants (or first component comprising the metal proppants) injected into the adjacent offset well is less than about 1% (wt) of the total treatment fluid injected into the adjacent offset well.

In some embodiments, the amount of the exergonic gas generating promoter (or second component comprising the exergonic gas generating promoter) injected into the adjacent offset well is about 1 to about 5% (wt) of the metal proppants (or first component comprising the metal proppants) injected into the adjacent offset well. In some embodiments, the amount of the exergonic gas generating promoter (or second component comprising the exergonic gas generating promoter) injected into the adjacent offset well is about 1% (wt) of the metal proppants (or first component comprising the metal proppants) injected into the adjacent offset well. In some embodiments, the amount of the exergonic gas generating promoter (or second component comprising the exergonic gas generating promoter) injected into the adjacent offset well is about 2% (wt) of the metal proppants (or first component comprising the metal proppants) injected into the adjacent offset well. In some embodiments, the amount of the exergonic gas generating promoter (or second component comprising the exergonic gas generating promoter) injected into the adjacent offset well is about 3% (wt) of the metal proppants (or first component comprising the metal proppants) injected into the adjacent offset well. In some embodiments, the amount of the exergonic gas generating promoter (or second component comprising the exergonic gas generating promoter) injected into the adjacent offset well is about 4% (wt) of the metal proppants (or first component comprising the metal proppants) injected into the adjacent offset well. In some embodiments, the amount of the exergonic gas generating promoter (or second component comprising the exergonic gas generating promoter) injected into the adjacent offset well is about 5% (wt) of the metal proppants (or first component comprising the metal proppants) injected into the adjacent offset well.

In some embodiments, the mitigation methods described herein further comprise injecting a wettability modifier (or third component comprising a wettability modifier) into the adjacent offset well. In any of the mitigation methods described herein, any of the wettability modifiers (or third components comprising the wettability modifier) described herein can be used.

In some embodiments, the wettability modifier (or third component comprising a wettability modifier) is mixed with the metal proppants (or first component comprising the metal proppants) and the exergonic gas generating promoter (or second component comprising the exergonic gas generating promoter) at the surface of the adjacent offset well to form the composition, prior to injecting the composition into the adjacent offset well.

In some embodiments, the reaction between the metal proppant and water, promoted by the exergonic gas generating promoter and temperature, can be delayed by introducing the metal proppant and the exergonic gas generating promoter into the subterranean formation in separate fluids. For example, in some embodiments, in the method of mitigating well-to-well communication between an infill well and an adjacent offset well while hydraulically fracturing at least one infill well, the method comprises injecting a first component into an adjacent offset well, wherein the first component comprises metal proppants and injecting a second component into the adjacent offset well, wherein the second component comprises an exergonic gas generating promoter; thereby generating a slow exergonic gas reaction in situ wherein the generated gas pressurizes the depleted subterranean formation. The first component comprising metal proppant particulates may be placed into the fracture, along with the exergonic gas generating promoter. In some embodiments, the first component comprising metal proppant particulates may be placed into the far reaches of a macrofracture, which may be very small, or within a microfracture to prop open portions or all of those fractures after hydraulic pressure is removed. A second component may thereafter be introduced into the subterranean formation, the second component comprising an exergonic gas generating promoter. The metal proppant particulates and the exergonic gas generating promoter may then contact one another within the fracture and react together so as to generate gas. The increased pressure as a result of the gas released from the reaction of the exergonic gas generating promoter and metal proppant particulates may overcome the tensile strength of the formation, thereby leading to the formation or extension of fractures. Thereafter, a water-based fluid may be introduced into the subterranean formation so as to place the metal proppant particulates or exergonic gas generating promoter within the fracture and form a proppant pack therein. In some embodiments, the first component may comprise metal proppants and not the exergonic gas generating promoter and the second component may comprise the exergonic gas generating promoter and not the metal proppants. In some embodiments, the steps of introducing the first and second components may be repeated at a second treatment interval and up to as many treatment intervals as are present in a subterranean formation, depending on the operations being performed.

In order that the subject matter disclosed herein may be more efficiently understood, examples are provided below. It should be understood that these examples are for illustrative purposes only and are not to be construed as limiting the claimed subject matter in any manner.

EXAMPLES

Example 1: A Slow Exergonic Gas Generation Compositions at Low Temperature

The components in Table 1 were mixed for 10 seconds at 65° F., and then the mixture was visually observed for a hydrogen gas generation reaction. No gas generation was observed after about 5 minutes at ambient conditions. After 5 minutes, gas bubbles were slowly generated and continued for an observation period of 10 days. The gas was still being generated when the observation stopped. Also, it was observed that the temperature of the mixture was not increased due to the reaction.

TABLE 1

| Item | Amount |
|---|---|
| Water | 1000 ml |
| Al powder | 2.0 g |
| $Mg(OH)_2$ | 0.05 g |

Example 2: Slow Exergonic Gas Generation Compositions at Elevated Temperature The components in Table 1 were mixed for 10 seconds at 65° F., and the mixture was then inserted in a 150° F. hot-water bath and visually observed for a hydrogen gas generation reaction. As the temperature of the mixture was gradually increasing in the bath, gas bubbles were slowly generated and continued for an observation period of 5 days. The gas was still being generated when the observation stopped, but the gas generation rate was getting weaker (i.e., less gas being generated per minute). The reaction seemed to be more efficient at 150° F. compared to 65° F. but, in both cases, the gas was slowly generated over a long period of time (i.e., days).

Example 3: Water-Based Hydraulic Fracturing Treatment with an Exergonic Gas Generation Reaction (Prophetic Example)

A pad fluid for hydraulic fracturing treatment on the surface of hydraulic fracturing wellsite can be prepared by mixing on the fly 30,000 gal of slickwater treatment fluid, 2,000 lb of aluminum powder (D50=25-30 micron), and 50 lb of magnesium hydroxide. The mixture can be injected into an ultra/low-permeability hydrocarbon-bearing formation at rate of 100 bbl/min. A slow gas generation reaction will take place inside the generated and/or induced fractures between the water and aluminum promoted by magnesium hydroxide and the reservoir temperature.

Example 4: Mitigation of Well-to-Well Communication while Hydraulically Fracturing at Least One Infill Well (Prophetic Example)

A treatment fluid on the surface of an adjust off-set well site can be prepared by mixing on the fly 10,000 gal of water, 50,000 lb of Aluminum powder (D50=15-25 micron), and 2500 lb of magnesium hydroxide or calcium hydroxide. The mixture can be injected into the adjust well at least 24 hours before starting hydraulic fracturing an infill well, at rate of 2-10 bbl/min. A slow gas generation reaction will take place inside the depleted rock interval surrounding the adjust off-set well leading to an increase in the reservoir pressure and its associated fracture gradient. The increased pressure will reduce the communication that could happen during injecting the fracturing fluid into the infill well.

Example 5: A Pressurizing Test in a Horizontal Well Using In-Situ Exergonic Gas Generating Reaction A treatment fluid, of roughly 900 gal of a solvent-based dispersion containing 50 wt % atomized aluminum powder, 600 bbl of produced water and 300 gal of a solvent based dispersion containing 35 wt % $Ca(OH)_2$, was injected at 7-12 bbl/minute pump rate into a pilot well. The well was then shut-in to allow for a continuous real-time pressure monitoring (using surface pressure recorders with continuous fluid monitoring) for more than 5 days. The pilot test effectively demonstrated the ability of the reaction to both build up significant pressure and maintain the pressure increase for an extended period. The post-treatment bottom-hole pressure (BHP) was higher than the virgin reservoir pressure (Virgin $P_r$) for about 24 hours despite the small volume of injected water and high leak-off rate due to the relatively high reservoir permeability. The post-treatment BHP was still considerably higher than the pre-job BHP for several days(see, FIG. 1 depicting the pilot well pressure results). The pilot well test was performed on a horizontal well located in Saskatchewan, Canada employing the following parameters:

TVD=2,257 ft;
TD=4,616 ft, Lateral Length=about 2300 ft;
Number of frac stages=15;
Completion method=Cemented casing plug & perf;
BHT=71° F.;
Pre-job BHP=435 psi;
Avg. $K_{max}$=4-54 mD;
Avg. $K_{90}$=40-45 mD;
Avg. $K_{vert}$=1.0 mD;
Avg. Porosity=19-23%;
Virgin $P_r$=~1,000 psi;
Start production date=10/10/2014; and
Closest offset well=500 ft.

Various modifications of the described subject matter, in addition to those described herein, will be apparent to those skilled in the art from the foregoing description. Such modifications are also intended to fall within the scope of the appended claims. Each reference (including, but not limited to, journal articles, U.S. and non-U.S. patents, patent application publications, international patent application publications, gene bank accession numbers, and the like) cited in the present application is incorporated herein by reference in its entirety.

What is claimed is:

1. A water-based hydraulic fracturing treatment fluid system for generating an exergonic gas generation reaction over a period of 1-10 days comprising:
- a) a first component comprising metal proppants having a size from about 0.1 microns to about 2000 microns; and
- b) a second component comprising an exergonic gas generating promoter;
- wherein one of the first component or the second component is suspended in an aqueous solvent; and
- wherein the metal proppants react with the aqueous solvent in the presence of the exergonic gas generating promoter to generate the exergonic gas generation reaction over the period of 1-10 days.

2. The water-based hydraulic fracturing treatment fluid system according to claim 1, wherein (i) the first component is suspended in the aqueous solvent and the second component is suspended in a non-aqueous solvent; or (ii) the second component is suspended in the aqueous solvent and the first component is suspended in a non-aqueous solvent.

3. The water-based hydraulic fracturing treatment fluid system according to claim 1, wherein (i) the first component is suspended in the aqueous solvent and the second component is in a dry form; or (ii) the second component is suspended in the aqueous solvent and the first component is in a dry form.

4. The water-based hydraulic fracturing treatment fluid system according to claim 1, wherein the metal proppants are aluminum proppants, silicon proppants, or iron proppants, or any combination thereof.

5. The water-based hydraulic fracturing treatment fluid system according to claim 4, wherein the metal proppants have a size from about 1 micron to about 150 microns.

6. The water-based hydraulic fracturing treatment fluid system according to claim 4, wherein the metal proppants are aluminum proppants.

7. The water-based hydraulic fracturing treatment fluid system according to claim 6, wherein the aluminum proppants are atomized aluminum powder having an average particle size of from about 0.1 microns to about 100 microns.

8. The water-based hydraulic fracturing treatment fluid system according to claim 1, wherein the exergonic gas generating promoter is a hydroxide promoter, a metal oxide promoter, an acid, or a salt promoter, or any combination thereof.

9. The water-based hydraulic fracturing treatment fluid system according to claim 8, wherein:
- the exergonic gas generating promoter is the hydroxide promoter, and the hydroxide promoter is $Ca(OH)_2$, $Mg(OH)_2$, NaOH, KOH, or a combination thereof;
- the exergonic gas generating promoter is the metal oxide promoter, and the metal oxide promoter is CaO or $Al_2O_3$ powder; or
- the exergonic gas generating promoter is the salt promoter, and the salt promoter is NaCl, KCl, $CaCl_2$, or $MgCl_2$.

10. The water-based hydraulic fracturing treatment fluid system according to claim 8, wherein the exergonic gas generating promoter is in an amount from about 0.001% (wt) to about 50% (wt) of the metal proppants.

11. The water-based hydraulic fracturing treatment fluid system according to claim 8, wherein the exergonic gas generating promoter is in an amount from about 0.1% (wt) to about 10% (wt) or about 0.1% (wt) to about 5% (wt) of the metal proppants.

12. The water-based hydraulic fracturing treatment fluid system according to claim 1, further comprising a friction reducer, a gum, a polymer, a proppant, a scale inhibitor, an oxygen scavenger, an iron controller, a crosslinker, a corrosion inhibitor, a breaker, a surfactant, a de-emulsifier, a biocide, an acid, or a clay control agent, or any combination thereof.

13. The water-based hydraulic fracturing treatment fluid system according to claim 1, further comprising a wettability modifier.

14. The water-based hydraulic fracturing treatment fluid system according to claim 13, wherein the wettability modifier is in an amount of about 1 to about 20 gallons per 1000 gallons of the treatment fluid.

15. The water-based hydraulic fracturing treatment fluid system according to claim 13, wherein the wettability modifier is a nanofluid, a micro emulsion, a nano emulsion, a polymer, a fluorinated material, a silane, or a surfactant, or any combination thereof.

16. The water-based hydraulic fracturing treatment fluid system according to claim 13, wherein the wettability modifier is a silica, an alumina, or a titania nano-dispersion.

17. The water-based hydraulic fracturing treatment fluid system according to claim 13, wherein the wettability modifier is an anionic, nano-ionic, or cationic siloxane surfactant or fluorosurfactant.

18. A water-based hydraulic fracturing treatment fluid composition for generating an exergonic gas generation reaction over a period of 1-10 days comprising:
- a) metal proppants having a size from about 0.1 microns to about 2000 microns; and
- b) an exergonic gas generating promoter;
- wherein one or both of the metal proppants and the exergonic gas generating promoter are suspended in an aqueous solvent; and
- wherein the metal proppants react with the aqueous solvent in the presence of the exergonic gas generating promoter to generate the exergonic gas generation reaction over the period of 1-10 days.

19. A method of hydraulic fracturing a hydrocarbon-bearing formation by generating an exergonic gas generation reaction over a period of 1-10 days, the method comprising:
- a1) injecting a water-based fluid into the formation; and
- b1) injecting metal proppants into the formation, and injecting an exergonic gas generating promoter into the formation;
- reacting the metal proppants with the water-based fluid in the presence of the exergonic gas generating promoter and thereby generating the exergonic gas generation reaction downhole over the period of 1-10 days and hydraulically fracturing the hydrocarbon-bearing formation;

or a2) injecting a water-based fluid into the formation; and b2) mixing a first component comprising metal proppants with a second component comprising an exergonic gas generating promoter at the surface of the formation to form a composition, and injecting the composition into the formation;

reacting the metal proppants with the water-based fluid in the presence of the exergonic gas generating promoter and thereby generating the exergonic gas generation reaction downhole over the period of 1-10 days and hydraulically fracturing the hydrocarbon-bearing formation.

* * * * *